(12) United States Patent
Nakama

(10) Patent No.: US 10,191,481 B2
(45) Date of Patent: Jan. 29, 2019

(54) NUMERICAL CONTROLLER AND NUMERICAL CONTROL SYSTEM IN WHICH THE CONTROLLER IS CONNECTED BY NETWORK

(71) Applicant: FANUC Corporation, Yamanashi (JP)

(72) Inventor: Tomomasa Nakama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 192 days.

(21) Appl. No.: 15/185,059

(22) Filed: Jun. 17, 2016

(65) Prior Publication Data

US 2016/0378096 A1 Dec. 29, 2016

(30) Foreign Application Priority Data

Jun. 23, 2015 (JP) .................. 2015-125537

(51) Int. Cl.
*G05B 23/02* (2006.01)
*G06F 11/36* (2006.01)

(52) U.S. Cl.
CPC ........ *G05B 23/0264* (2013.01); *G06F 11/364* (2013.01); *G05B 2219/31462* (2013.01)

(58) Field of Classification Search
CPC .................. G05B 23/0264; G05B 2219/31462
USPC ........................................ 714/43, 56; 700/80
See application file for complete search history.

(56) References Cited

U.S. PATENT DOCUMENTS

| 5,608,867 A | * | 3/1997 | Ishihara | ............... G06F 11/364 714/25 |
| 2006/0224256 A1 | * | 10/2006 | Inoue | .................. G05B 19/409 700/83 |
| 2010/0228507 A1 | | 9/2010 | Hosokawa et al. | |

FOREIGN PATENT DOCUMENTS

| JP | H05108398 A | 4/1993 |
| JP | 9-282030 A | 10/1997 |
| JP | 11-143789 A | 5/1999 |
| JP | 2005-332030 A | 12/2005 |
| JP | 2008-176579 A | 7/2008 |
| JP | 2010205064 A | 9/2010 |

OTHER PUBLICATIONS

Office Action in JP Application No. 2015-125537, dated Aug. 1, 2017, 8 pp.

* cited by examiner

*Primary Examiner* — Sean Shechtman
(74) *Attorney, Agent, or Firm* — Hauptman Ham, LLP

(57) ABSTRACT

A numerical controller in the present invention includes a bus trace circuit configured to fetch a bus cycle satisfying preset conditions, an alarm history, an alarm data acquisition table in which whether to acquire trace data is recorded for each alarm, and a trace circuit setting table in which fetching conditions of the bus cycle of the bus trace circuit are recorded for each alarm, and identifies an alarm for which the trace data is to be fetched from the alarm history and the alarm data acquisition table, reads the fetching conditions of the bus cycle corresponding to the alarm from the trace circuit setting table, sets the fetching conditions to the bus trace circuit, and acquires the trace data of the bus cycle based on the fetching conditions that are set through the bus trace circuit.

6 Claims, 5 Drawing Sheets

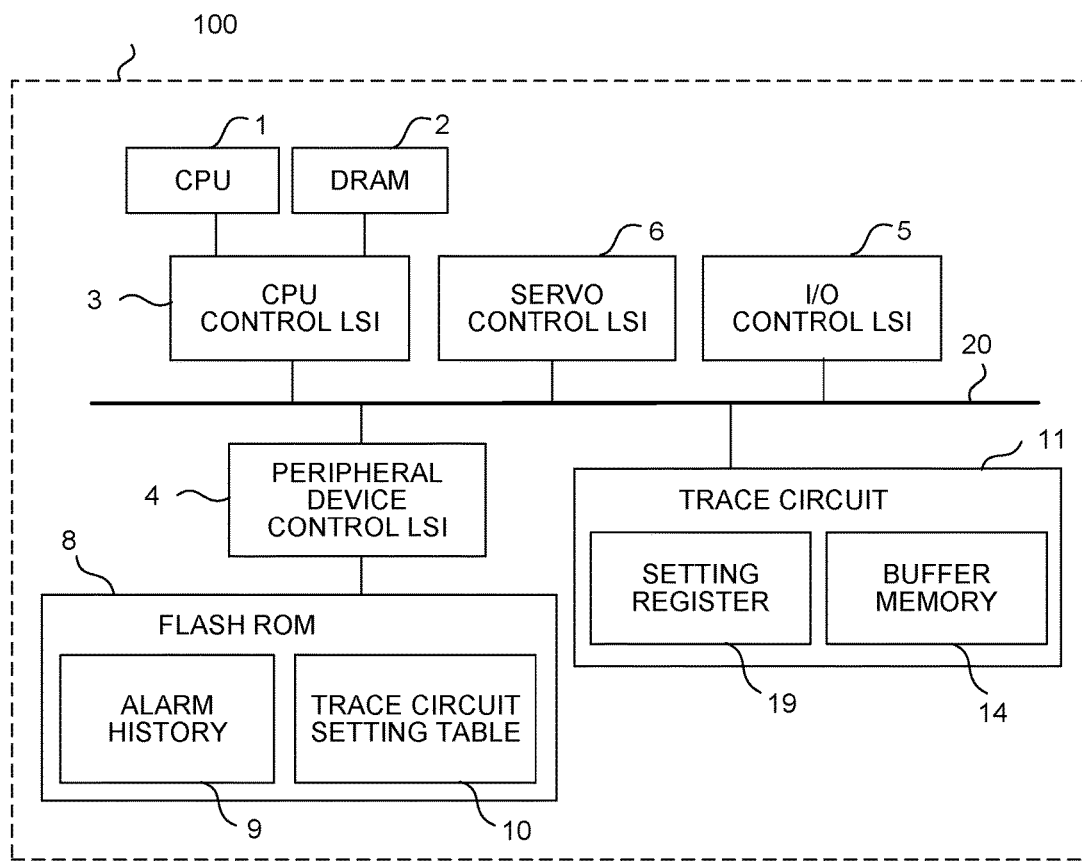

FIG. 3

| ALARM NUMBER | TRACE ACQUISITION | TARGET SETTING REGISTER | SETTINGS |
|---|---|---|---|
| Alarm A | ACQUIRE | Register 1 | SIZE=0x400, COMMAND TYPE=WRITE |
| | | Register 2 | STARTING ADDRESS OF TRACE ACQUISITION RANGE=0x8C004000 |
| | | ... | ... |
| | | Register N | TRACE CIRCUIT CONTROL=ACTIVATE |
| Alarm B | NOT ACQUIRE | ... | NO SETTING |
| ... | ... | Register 1 | SIZE=0x400, COMMAND TYPE=READ |
| | | Register 2 | STARTING ADDRESS OF TRACE ACQUISITION RANGE=0x94405000 |
| | | ... | ... |
| Alarm Z | ACQUIRE | Register N | TRACE CIRCUIT CONTROL=ACTIVATE |

| OCCURRENCE TIME | OCCURRENCE APPARATUS | ALARM NUMBER |
|---|---|---|
| 2015/3/6 12:34:56 | NUMERICAL CONTROLLER 2 | Alarm X |
| 2015/3/5 9:55:00 | NUMERICAL CONTROLLER 1 | Alarm X |
| 2015/1/9 17:21:40 | NUMERICAL CONTROLLER 3 | Alarm Z |
| ...... | ...... | ...... |

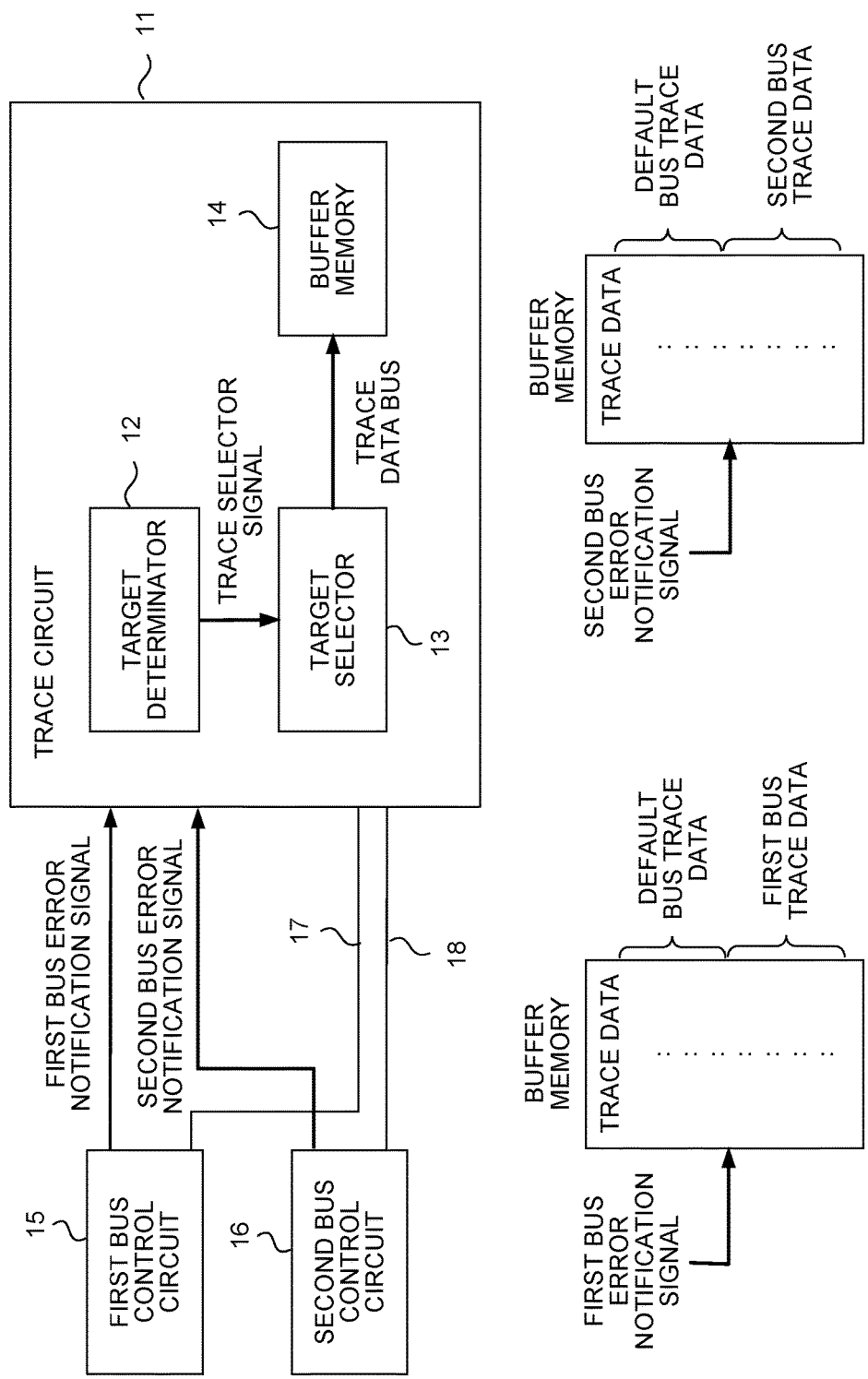

NUMERICAL CONTROLLER AND
NUMERICAL CONTROL SYSTEM IN
WHICH THE CONTROLLER IS
CONNECTED BY NETWORK

RELATED APPLICATIONS

The present application claims priority to Japanese Application Number 2015-125537, filed Jun. 23, 2015, the disclosure of which is hereby incorporated by reference herein in its entirety.

BACKGROUND OF THE INVENTION

1. Field of the Invention

The present invention relates to a numerical controller, and in particular, relates to a numerical controller having a fault analysis data acquisition function when an alarm of the numerical controller is raised and a numerical control system in which the numerical controller is connected to a network.

2. Description of the Related Art

In a numerical controller, units such as a CPU, flash memory, motor control LSI, and I/O control LSI are connected to an internal bus thereof directly or via control LSI and read and write data between these units and a fault occurrence notification signal indicating that an alarm is raised in some unit flow through the internal bus.

Conventionally, when an alarm is raised in the internal bus of a numerical controller, a log of a related register or the like has been left in accordance with the alarm. In this case, how to leave appropriate information automatically is important for fault recovery.

In JP 05-108398 A, when the same alarm is raised successively, the amount of information for fault analysis is increased by changing places where a log is kept. When, for example, as illustrated in FIG. 6, an alarm of servo control LSI 6 is raised, a register 7 related to the alarm in the servo control LSI 6 is kept in the log for the first alarm and if the next alarm is the same alarm, another register determined in advance and not illustrated, DRAM 2 or the like is kept in the log.

However, while final values of the memory, registers and the like are kept in the log, no bus cycle such as which CPU or LSI writes to which register and which register is read is kept. In the fault analysis, information of a log alone may be insufficient and it is sometimes necessary to examine what kind of bus cycle arose and in that case, a bus trace circuit that stores bus cycles may be used.

JP 2010-205064 A discloses a bus trace circuit inside LSI and there is a plurality of trace target bus circuits and when a fault occurrence notification signal of each circuit is output, the trace circuit switches the trace target bus to acquire trace data corresponding to each alarm at a time close to the time when a fault occurs without increasing the circuit scale. In the example of FIG. 7, a first bus 17 and a second bus 18 have respective bus control circuits 15 and 16, and when each bus control circuit detects an error and notifies a trace circuit 11 of an error notification signal, a target determinator 12 of the trace circuit 11 determines the bus that has output the error notification signal as a trace target and notifies a target selector 13 of a trace selection signal, and the target selector 13 stores the bus that has output the error notification signal in a buffer memory 14. Though omitted in FIG. 7, other circuits and input/output of LSI are connected to the first bus and the second bus.

For an internal bus connecting LSI, however, in some cases there is a time difference between the cause of an alarm and an occurrence time of the alarm, for example, like a parity error of a memory, the true cause of an alarm is data to be written that is already damaged due to a failure of LSI that generates a write cycle when data is written into the memory, and the alarm is raised by reading the data. In that case, according to JP 2010-205064 A, necessary trace data cannot be acquired. Alternatively, JP 2010-205064 A contains a description of a trace target fixed mode, and when the mode is used, the mode needs to be manually set and trace data cannot be acquired automatically.

Storing all trace data can be considered for fault analysis and in that case, a large quantity of memory as a storage location needs to be prepared, leading to an increased circuit scale. Thus, the address range or the like is frequently set to a bus trace circuit to fetch only bus cycles satisfying the setting.

However, the bus cycle to be fetched is different from alarm to alarm and thus, conventionally, information such as a log left is checked after an alarm is raised and if the cause of the fault is not known from the information, it becomes necessary to consider settings to be made to the bus trace circuit, create software dedicated to make the settings to a setting register of the bus trace circuit, and install the software in a numerical controller, taking time and efforts.

SUMMARY OF THE INVENTION

Thus, an object of the present invention is to provide a numerical controller capable of automatically acquiring data needed for fault investigation without a load being imposed on the processor or the internal bus and a numerical control system in which the numerical controller is connected to a network.

A numerical controller according to the present invention has a data acquisition function that acquires trace data of a bus cycle of an internal bus and the numerical controller includes a bus trace circuit configured to fetch the bus cycle satisfying preset conditions, an alarm history, an alarm data acquisition table in which whether to acquire the trace data is recorded for each alarm, and a trace circuit setting table in which fetching conditions of the bus cycle of the bus trace circuit are recorded for each alarm, wherein the numerical controller identifies an alarm for which the trace data is to be fetched from the alarm history and the alarm data acquisition table, reads the fetching conditions of the bus cycle corresponding to the alarm from the trace circuit setting table, and sets the fetching conditions to the bus trace circuit and the bus trace circuit acquires the trace data of the bus cycle based on the fetching conditions that are set.

According to the present invention, data needed for fault investigation can automatically be fetched on a small circuit scale without a load being imposed on the processor or the internal bus during normal operation.

The numerical controller evaluates the alarm one by one by moving back from the alarm raised last in the alarm history based on the alarm data acquisition table when activated to identify the alarm for which the trace data is to be fetched.

In the numerical controller, conditions for fetching the bus cycle of the bus trace circuit include at least any one of an address range, a command, a bus cycle generating device, data, a start cycle of a trace operation, and an end cycle of a trace operation.

A numerical control system is configured by any plurality of the numerical controllers being connected to a network and the plurality of the numerical controllers shares an alarm history and each of the plurality of the numerical controllers identifies an alarm for which trace data is to be fetched from the alarm history and the alarm data acquisition table, reads fetching conditions of a bus cycle corresponding to the alarm from the trace circuit setting table, sets the fetching conditions to the bus trace circuit and acquire the trace data of the bus cycle based on the fetching conditions that are set.

BRIEF DESCRIPTION OF THE DRAWINGS

The above object and other objects of the present invention will be apparent from the description below with reference to appended drawings. Among these drawings:

FIG. 1 is a schematic view of a numerical controller according to an embodiment of the present invention;

FIG. 2 is an example of an alarm history according to an embodiment of the present invention;

FIG. 3 is an example of a trace circuit setting table according to an embodiment of the present invention;

FIG. 7 is a schematic view of a trace circuit according to a conventional technology 2.

DETAILED DESCRIPTION OF THE PREFERRED EMBODIMENTS

Figures 4, 5:
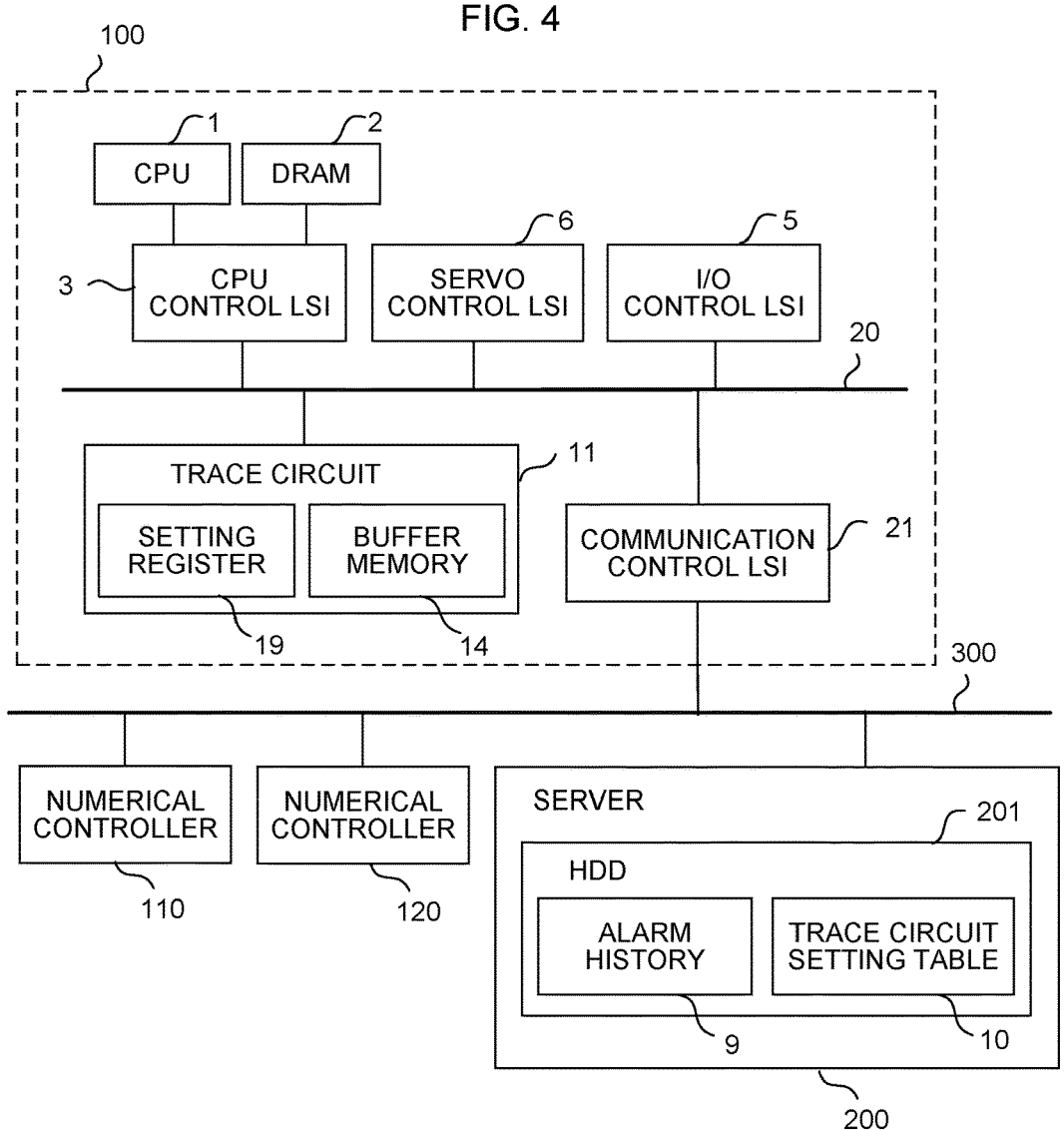
FIG. 4 is a schematic view of a numerical control system according to another embodiment of the present invention.
FIG. 5 is an example of the alarm history according to another embodiment of the present invention.
Figure 6:
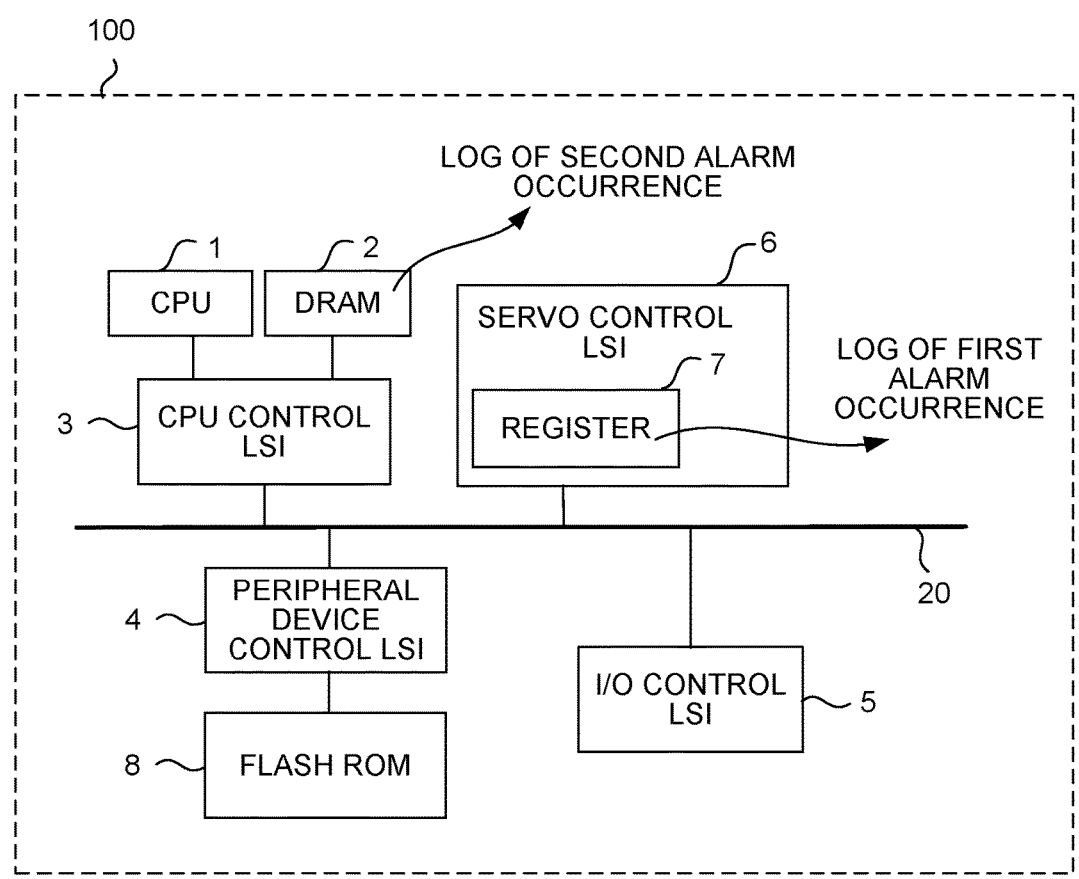
FIG. 6 is a schematic view of the numerical controller according to a conventional technology 1.

Hereinafter, the embodiments of the present invention will be described with reference to the drawings.

FIG. 1 shows a schematic diagram inside a numerical controller according to an embodiment of the present invention. A CPU 1 and a DRAM 2 are connected to an internal bus 20 of a numerical controller 100 in the present embodiment through CPU control LSI 3, a flash ROM 8 is connected thereto through peripheral device control LSI 4, and also a trace circuit 11 and other LSI such as I/O control LSI 5 and servo control LSI 6 are connected thereto.

The trace circuit 11 includes a setting register 19 and the bus cycle to be fetched can be selected by settings of the setting register 19. Settings include, for example, the address range of access targets of the bus cycle, the type of command such as single read and burst write, the type of device that has generated a bus cycle, whether a bit with read or write data is 0 or 1, and a cycle to be a trigger of starting or terminating a trace and the desired bus cycle can be captured using a portion or all of these settings.

Information of an alarm history 9 and a trace circuit setting table 10 is stored in the flash ROM 8 and in the alarm history 9, as illustrated in FIG. 2, the time when an alarm is raised in the numerical controller 100 and the alarm number indicating content of the alarm are stored.

In the trace circuit setting table 10, for each alarm number, information whether to acquire trace data and the value set to the setting register 19 of the trace circuit 11 to capture the bus cycle useful for the fault analysis are stored. FIG. 3 shows an example of the trace circuit setting table 10.

In a setting in which the numerical controller 100 is activated, the CPU 1 checks the alarm number raised last from the alarm history 9 of the numerical controller 100 in the flash ROM 8 and determines whether the alarm number is a number for which trace data should be fetched based on information whether to acquire trace data of the trace circuit setting table 10 similarly in the flash ROM 8. If the alarm number is a number for which trace data does not have to be fetched, the CPU 1 repeatedly checks the alarm number raised just before and determines whether the alarm number is a number for which trace data should be fetched again to determine the alarm number raised last for which trace data should be fetched. The CPU 1 reads settings of the trace circuit 11 set to the determined alarm number from the trace circuit setting table 10 and sets the settings to the setting register 19 of the trace circuit 11. When settings are made according to the trace circuit setting table 10 illustrated in FIG. 3, the size of the address from which a trace is acquired and the command type are set to Register 1 of the setting register 19 of the trace circuit 11, the starting address of the range from which the trace is acquired is set to Register 2, settings are also made, though omitted, to other registers, and lastly activation settings are written into a trace circuit control register of Register N to activate the trace circuit 11.

After various settings are completed, the trace circuit 11 stores trace data of the bus cycle satisfying conditions set to the setting register 19 and flowing through the internal bus in a buffer memory inside the trace circuit. Without having any buffer memory, storing the data in, for example, the DRAM 2 connected to the CPU control LSI 3 can also be considered, but in that case, the bus cycle needs to be generated in the internal bus 20 and a load is imposed on the internal bus 20.

Then, if an alarm is raised and the alarm is the same as the alarm raised last for which trace data should be fetched, a bus cycle useful for fault analysis can be captured. When an alarm is raised, trace data can also be stored by transferring content of the buffer memory 14 of the trace circuit 11 to the flash ROM 8 by CPU 1 or a DMA circuit (not illustrated) because of the possibility that the CPU 1 cannot operate due to a failure. By leaving the alarm number in that case, the type of the stored trace data can be indicated.

The CPU 1 needs to access the trace circuit 11 only for, as described above, settings to the setting register 19 made when the numerical controller 100 is activated and the transfer of data from the buffer memory 14 to the flash ROM 8 when an alarm is raised and thus, no load on the CPU is generated by operating the trace circuit 11 during normal operation. Similarly, a load is imposed on the internal bus 20 by the trace circuit 11 only when the numerical controller 100 is activated or an alarm is raised and thus, no load on the internal bus 20 is generated by operating the trace circuit 11.

Incidentally, the present configuration is only by way of example and does not limit the present invention. For example, storing the alarm history 9 and the trace circuit setting table 10 in different storage devices or an external storage device can be considered. Information whether to acquire trace data and values set to the setting register 19 of the trace circuit 11 to capture the bus cycle useful for fault analysis thereof do not have to be recorded in one setting table and may be recorded separately.

FIG. 4 shows a schematic view of a numerical control system according to another embodiment of the present invention. The CPU 1 and the DRAM 2 are connected to the internal bus 20 of the numerical controller 100 through the CPU control LSI 3 and also the trace circuit 11, communication control LSI 21, and other LSI such as the I/O control LSI 5 and the servo control LSI 6 are connected thereto.

The numerical controller 100 is connected to a communication path 300 via the communication control LSI 21 and a server 200 and a plurality of numerical controllers such as numerical controllers 110, 120 configured in the same manner as the numerical controller 100 are connected to the communication path 300.

The server 200 contains a hard disk 201, the alarm history 9 and information of the trace circuit setting table 10 illustrated in FIG. 3 are stored in the hard disk 201, and as illustrated in FIG. 5, the time when an alarm is raised in each numerical controller, the identification name of the numerical controller in which the alarm is raised, and the alarm number indicating alarm content are stored in the alarm history 9.

In settings performed when each numerical controller is activated, the CPU of each numerical controller accesses the server 200 via the communication control LSI 21 to check the alarm history 9 of the numerical controller in the hard disk 201 of the server 200 and checks the alarm number raised last for which trace data should be fetched by all numerical controllers connected to the communication path 300 from the information whether to acquire trace data in the trace circuit setting table 10 similarly in the hard disk 201 of the server 200. The CPU 1 of each numerical controller reads settings of the trace circuit 11 set to the checked alarm number, and sets the settings to the setting register 19 of the trace circuit 11 of each numerical controller.

In this manner, for example, when a plurality of units of the same machine tool is used in one factory and an alarm is raised in one of the units, if the same alarm is subsequently raised in another machine connected to the communication path 300 after the alarm is raised in the original machine, a bus cycle useful for fault analysis can be captured.

According to a numerical control system in the present embodiment, rich data can be acquired and if an alarm is intermittent, the frequency of data acquisition can be increased by performing trace settings for investigating a common alarm in each numerical controller connected to a network.

This is useful when, for example, the design of a numerical controller or a machine tool is defective or for analysis of environmental factors like when a very loud noise is produced in some place of a factory and a plurality of machine tools is affected.

Incidentally, the present configuration is only by way of example and does not limit the present invention. For example, storing an alarm history and a trace circuit setting table in the flash ROM or the like of each numerical controller without providing a server and synchronizing the content thereof can be considered.

In the foregoing, an embodiment of the present invention has been described, but the present invention is not limited to only examples of the above embodiment and can be carried out in various forms by making appropriate alterations.

The invention claimed is:

1. A numerical controller having a data acquisition function that acquires trace data of a bus cycle of an internal bus, the numerical controller comprising:

a bus trace circuit configured to fetch the bus cycle satisfying preset conditions;

an alarm history;

an alarm data acquisition table in which whether to acquire the trace data is recorded for each alarm; and a trace circuit setting table in which fetching conditions of the bus cycle of the bus trace circuit are recorded for each alarm, wherein the numerical controller identifies an alarm for which the trace data is to be fetched from the alarm history and the alarm data acquisition table, reads the fetching conditions of the bus cycle corresponding to the alarm from the trace circuit setting table, and sets the fetching conditions to the bus trace circuit and the bus trace circuit acquires the trace data of the bus cycle based on the fetching conditions that are set.

2. The numerical controller having the data acquisition function according to claim 1, wherein the numerical controller evaluates the alarm one by one by moving back from the alarm raised last in the alarm history based on the alarm data acquisition table when activated to identify the alarm for which the trace data is to be fetched.

3. The numerical controller having the data acquisition function according to claim 1, wherein conditions for fetching the bus cycle of the bus trace circuit include at least any one of an address range, a command, a bus cycle generating device, data, a start cycle of a trace operation, or an end cycle of a trace operation.

4. A numerical control system having a data acquisition function in which a plurality of the numerical controllers according to claim 1 is connected to a network, wherein the plurality of the numerical controllers shares an alarm history, and each of the plurality of the numerical controllers identifies an alarm for which trace data is to be fetched from the alarm history and the alarm data acquisition table, reads fetching conditions of a bus cycle corresponding to the alarm from the trace circuit setting table, sets the fetching conditions to the bus trace circuit, and acquire the trace data of the bus cycle based on the fetching conditions that are set.

5. The numerical controller having the data acquisition function according to claim 1, further comprising:

a flash ROM storing the alarm history including the trace data; and a processor configured to store the trace data by transferring content of a buffer memory of the bus trace circuit to the flash ROM.

6. The numerical controller having the data acquisition function according to claim 1, further comprising:

a flash ROM storing the alarm history including the trace data; and a DMA circuit configured to store the trace data by transferring content of a buffer memory of the bus trace circuit to the flash ROM.

* * * * *